Nov. 24, 1970    R. W. NOLAN ET AL    3,543,126
BATTERY CHARGING SYSTEMS FOR ROAD VEHICLES
Filed June 14, 1968
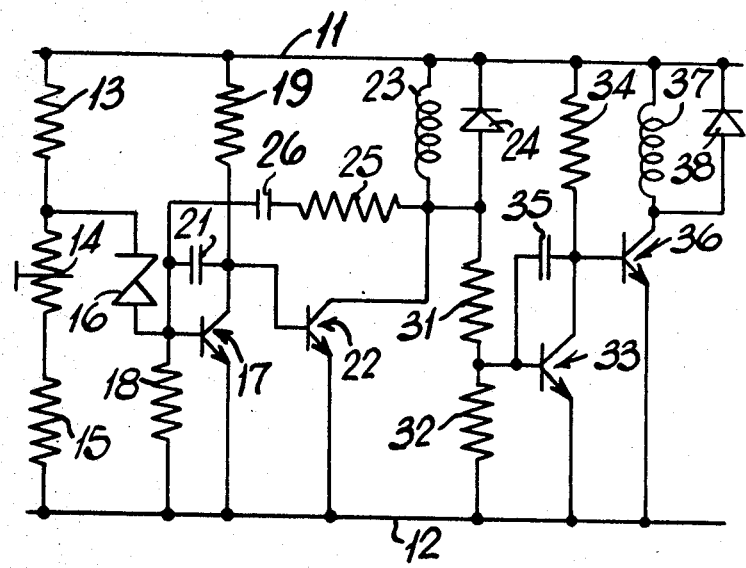
INVENTOR
Roger William Nolan
David Wiley
BY
ATTORNEYS

United States Patent Office 3,543,126
Patented Nov. 24, 1970

3,543,126
BATTERY CHARGING SYSTEMS FOR ROAD VEHICLES
Roger William Nolan, Redditch, and David Wiley, Walsall, England, assignors to Joseph Lucas (Industries) Limited, Birmingham, England, a British company
Filed June 14, 1968, Ser. No. 737,091
Claims priority, application Great Britain, July 7, 1967, 31,442/67
Int. Cl. H02j 7/04
U.S. Cl. 320—39        1 Claim

ABSTRACT OF THE DISCLOSURE

A battery charging system for a road vehicle where substantial output is required from the generating equipment of the vehicle includes two generators each charging the battery. A voltage regulator controls the output of the first generator, and the slave circuit coupled to and operable by the voltage regulator controls the output of the second generator.

---

This invention relates to battery charging systems for road vehicles.

A battery charging system in accordance with the invention comprises in combination first and second generators each charging a battery, a voltage regulator controlling the output of the first generator, and a slave circuit coupled to and operable by said voltage regulator, said slave circuit controlling the output of the second generator.

In certain vehicles where substantial demands are made on the generating equipment, it is cheaper to provide two generators than a single generator having the same output as the combined outputs of the two generators. However, if two generators are used and individual voltage regulators control their outputs, the overall cost of the system is considerably increased by the provision of the second voltage regulator, and moreover, it is extremely difficult to ensure that the power is shared equally. By using a slave unit controlled by the voltage regulator, the output of the second generator can be adequately controlled in the same way as the output of the first generator, but the slave unit can be a simpler circuit which is less expensive than the voltage regulator.

The accompanying drawing is a circuit diagram illustrating one example of the invention.

Referring to the drawing, there are provided positive and negative supply lines 11, 12 between which the battery of the vehicle is connected. The battery is charged by first and second generators, which can be dynamos and associated cut-outs, or alternators and associated full wave rectifiers, the output from each of the generators being applied to the supply lines 11, 12.

The output from the first generator is controlled by a voltage regulator including resistors 13, 14, 15 connected in series between the lines 11, 12, the resistor 14 being pre-set to define the regulating voltage. The junction of the resistors 13, 14 is connected through a Zener diode 16 to the base of an n-p-n transistor 17 having its emitter connected to the line 12, its base connected to the line 12 through a resistor 18 and its collector connected to the line 11 through a resistor 19. A capacitor 21 is connected between the base and collector of the transistor 17 to minimize radio interference.

The collector of the transistor 17 is further connected to the base of an n-p-n transistor 22, the emitter of which is connected to the line 12 and the collector of which is connected to the line 11 through the field winding 23 of the first generator, the winding 23 being bridged by a diode 24. Moreover, the collector of the transistor 22 is connected to the base of the transistor 17 through a feedback circuit including a resistor 25 and a capacitor 26 in series. In use, when the voltage between the lines 11, 12 is below a predetermined value, the Zener diode 16 is non-conductive and current flowing through the resistor 19 turns the transistor 22 on so that current flows in the field winding 23. As soon as the predetermined value is reached, the Zener diode 16 breaks down and turns the transistor 17 on, so diverting current from the base of the transistor 22. By virtue of the feedback circuit through resistor 25 and capacitor 26, the circuit oscillates between one state with the transistor 22 fully on and the transistor 17 off, and a second state with the transistor 17 fully on and the transistor 22 off, the mark-space ratio being determined by the current flowing through the Zener diode 16, which in turn is dependent on the voltage between the lines 11, 12. Thus, the mean current flow in the winding 23 is varied to maintain the voltage between the lines 11, 12 substantially constant.

The output from the second generator is controlled by a slave circuit coupled to and operable by the voltage regulator. This slave circuit includes a pair of resistors 31, 32 connected in series between the collector of the transistor 22 and the line 12, the junction of these resistors being connected to the base of an n-p-n transistor 33 having its emitter connected to the line 12 and its collector connected to the line 11 through a resistor 34. The collector and base of the transistor 33 are bridged by a capacitor 35 which minimises radio interference, and the collector of the transistor 33 is further connected to the base of an n-p-n transistor 36 having its emitter connected to the line 12 and its collector connected to the line 11 through the field winding 37 of the second generator, the winding 37 being bridged by a diode 38. It will be seen that when the transistor 22 is conducting, the transistor 33 receives no base current and so the transistor 36 receives base current through the resistor 34 and is fully conducting. When the transistor 22 is off, base current flows in the transistor 33, which conducts to divert current from the resistor 34 so that the transistor 36 is off. Thus, the transistor 36 behaves in exactly the same way as the transistor 22. Although there is a small current flowing the winding 23 even when the transistor 22 is off, this current is so small that it does not affect the operation of the first generator in any material respect.

It will be appreciated that if the second generator fails, the first generator will still provide an output which will be regulated. Moreover, even if the first generator fails, then provided that the failure does not involve the disconnection of the field winding 23, the second generator will still provide a regulated output.

Having thus described our invention what we claim as new and desire to secure by Letters Patent is:

1. A battery charging system for a road vehicle, comprising in combination a battery, a first generator, means coupling said first generator to said battery for charging said battery, a field winding forming part of said generator, a voltage regulator for controlling the output of said generator by varying the current flow in said field winding, said voltage regulator incorporating an output transistor connected in series with said field winding, an input transistor, means coupling said input transistor to said output transistor so that when said input transistor conducts base current is removed from said output transistor, a Zener diode in the base circuit of said input transistor, and means coupling said Zener diode to said battery whereby said Zener diode conducts to provide base current to said input transistor when the battery voltage exceeds a predetermined value, said system further including a second generator, means coupling said second generator to said battery so that said second generator also charges said battery, said generator also including a field winding and the system incorporating a control circuit for controlling the output of said second generator by varying the current flow in the field winding of said second generator, said control circuit having an output transistor connected in series with the field winding of said second generator, and input transistor, means coupling said input transistor to said output transistor so that when said input transistor conducts base current is removed from said output transistor, and a connection between the input transistor of the control circuit and the output transistor of the voltage regulator, whereby conduction of the output transistor of the voltage regulator removes base current from the input transistor of the control circuit.

References Cited

UNITED STATES PATENTS

| | | | |
|---|---|---|---|
| 2,859,356 | 11/1958 | King | 307—84 XR |
| 3,308,306 | 3/1967 | Bagno | 320 TD |
| 3,321,638 | 5/1967 | Pratt | 307—84 XR |
| 3,350,619 | 10/1967 | Jensen | 320—64 XR |
| 3,378,708 | 4/1968 | Baker | 322—28 XR |
| 3,443,193 | 5/1969 | Wright | 320—64 |

WILLIAM M. SHOOP, JR., Primary Examiner

U.S. Cl. X.R.

307—84; 320—56, 61, 65